US009037839B2

(12) United States Patent
Shimatani

(10) Patent No.: US 9,037,839 B2
(45) Date of Patent: May 19, 2015

(54) SECURE STARTUP OF INFORMATION PROCESSING APPARATUS INCLUDING DETERMINING WHETHER CONFIGURATION INFORMATION FOR HARDWARE RESOURCES OF THE INFORMATION PROCESSING APPARATUS HAVE BEEN MODIFIED

(75) Inventor: Yoson Shimatani, Onomichi (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 13/238,188

(22) Filed: Sep. 21, 2011

(65) Prior Publication Data

US 2012/0011352 A1  Jan. 12, 2012

Related U.S. Application Data

(63) Continuation of application No. PCT/JP2009/056675, filed on Mar. 31, 2009.

(51) Int. Cl.
*G06F 9/00* (2006.01)
*G06F 9/24* (2006.01)
*G06F 15/177* (2006.01)
*G06F 21/57* (2013.01)
*G06F 9/44* (2006.01)

(52) U.S. Cl.
CPC ............ *G06F 21/575* (2013.01); *G06F 9/4401* (2013.01)

(58) Field of Classification Search
CPC .............................. G06F 9/4401; G06F 21/575
USPC ............................................................ 713/1
See application file for complete search history.

(56) References Cited

U.S. PATENT DOCUMENTS

| 7,725,703 B2 | 5/2010 | Hunter et al. |
| 7,752,465 B2 | 7/2010 | Ebringer et al. |
| 7,930,563 B2 | 4/2011 | Ebringer et al. |
| 2005/0055575 A1* | 3/2005 | Evans et al. .................. 713/201 |

(Continued)

FOREIGN PATENT DOCUMENTS

| JP | 2005-301550 | 10/2005 |
| JP | 2005-301564 | 10/2005 |

(Continued)

OTHER PUBLICATIONS

International Search Report for PCT/JP2009/056675, mailed Jun. 30, 2009.

*Primary Examiner* — Thomas Lee
*Assistant Examiner* — Robert Cassity
(74) *Attorney, Agent, or Firm* — Staas & Halsey LLP

(57) ABSTRACT

When a match of a pair of a first configuration register value obtained by a configuration register value obtainment unit and a first configuration register value related to the first configuration register value stored in a storage unit with being related to the first startup control unit, or a match of a pair of a second configuration register value obtained by the configuration register value obtainment unit and a second configuration register value related to the second configuration register value stored in the storage unit with being related to the second startup control unit, is detected, startup processing of an information processing apparatus is continued. Thereby, the startup processing can be completed even when a part of processing units is swapped with a spare processing unit having the same configuration, and the functions of the startup control units can be effectively exploited.

8 Claims, 13 Drawing Sheets

(56) References Cited

U.S. PATENT DOCUMENTS

| | | |
|---|---|---|
| 2005/0257272 A1* | 11/2005 | Nakao .............................. 726/26 |
| 2006/0155988 A1* | 7/2006 | Hunter et al. ................. 713/164 |
| 2008/0114989 A1 | 5/2008 | Anbalagan et al. |
| 2008/0229114 A1 | 9/2008 | Okabe |
| 2008/0235804 A1 | 9/2008 | Bade et al. |
| 2013/0061056 A1* | 3/2013 | Proudler et al. .............. 713/176 |

FOREIGN PATENT DOCUMENTS

| | | |
|---|---|---|
| JP | 2006-323814 | 11/2006 |
| JP | 2008-123513 | 5/2008 |
| JP | 2008-226158 | 9/2008 |

* cited by examiner

FIG. 4

| List | PCR Number | Items to be measured |
|---|---|---|
| 1 | PCR[0] | Code of firmware<br>▪Version of firmware, etc. |
| 2 | PCR[1] | Settings for firmware<br>▪Information on processor, microcode, upgrade<br>▪Internal data of firmware stored in NVRAM |
| 3 | PCR[2] | Code of firmware for extension card<br>▪ Drivers on I/O card<br>▪Device drivers (supplied from third parties) |
| 4 | PCR[3] | Settings for firmware for extension card<br>▪Multi initiator settings for SCSI, etc. |
| 5 | PCR[4] | Code of OS loader<br>▪MBR (Master Boot Record), GRub (Grand Unified Boot loader), etc. |
| 6 | PCR[5] | Settings for OS loader<br>▪ Boot device information<br>▪Boot path setting information |

20

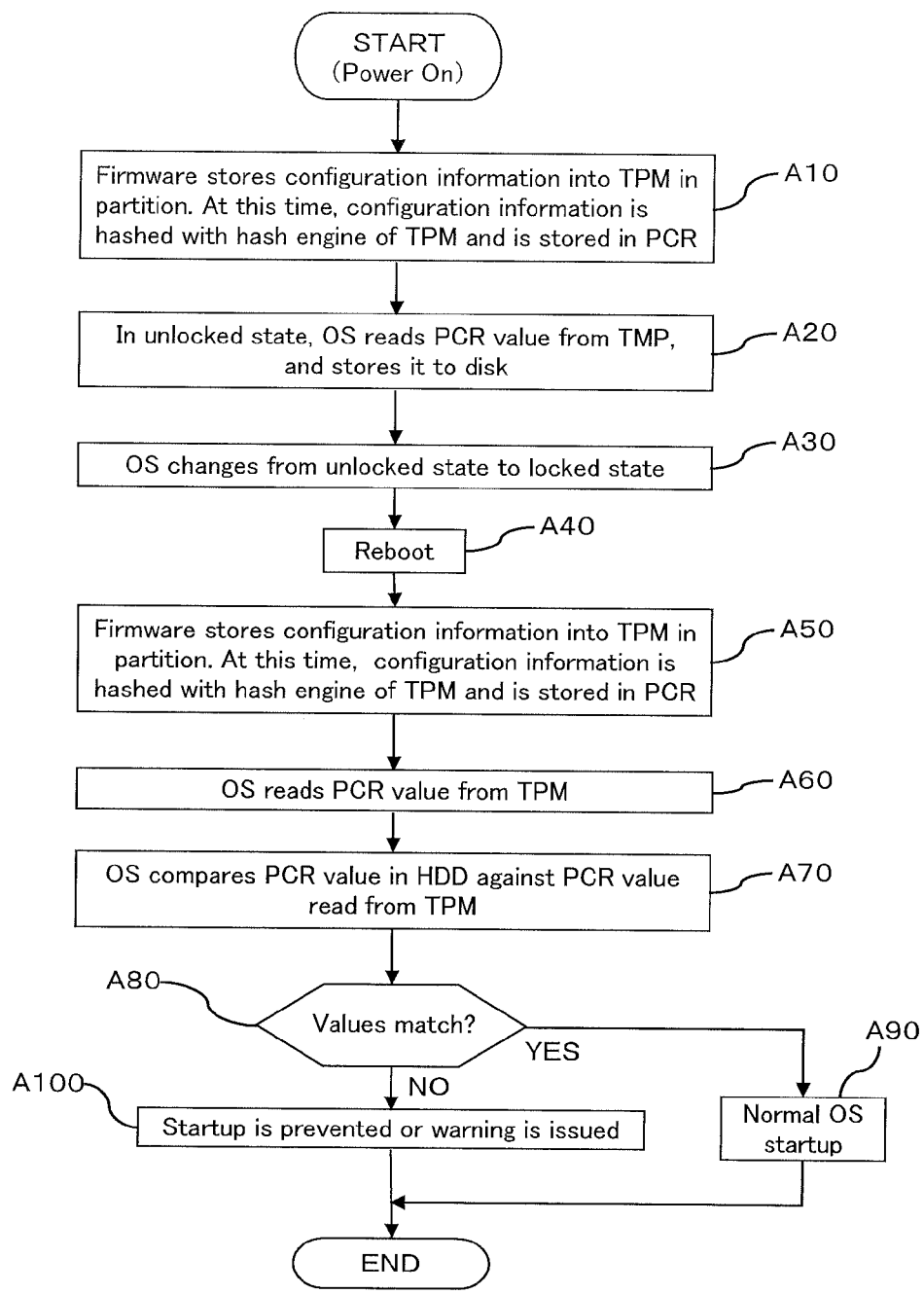

SECURE STARTUP OF INFORMATION PROCESSING APPARATUS INCLUDING DETERMINING WHETHER CONFIGURATION INFORMATION FOR HARDWARE RESOURCES OF THE INFORMATION PROCESSING APPARATUS HAVE BEEN MODIFIED

CROSS-REFERENCE TO RELATED APPLICATIONS

This application is a continuation Application of a PCT international application No. PCT/JP2009/056675 filed on Mar. 31, 2009 in Japan, the entire contents of which are incorporated by reference.

FIELD

The embodiments discussed herein relates to an information processing apparatus and a method of an information processing apparatus.

BACKGROUND

In recent years, an information processing terminal (information processing apparatus) including a security chip (security function module), such as a TPM, for an improved security level, has been well-known.

A TPM is a security chip, as a security control unit compliant with the standard defined by the Trusted Computing Group (TCG), i.e., a standardization organization. A TPM is integrated into a motherboard (system board) of an information processing apparatus, and is configured to include a non-volatile memory storing an encryption key (core encryption key) and the like used for secure communications and a special-purpose microprocessor for encryption processing, for example.

The information processing apparatus, upon its startup, checks by means of the TMP, whether its hardware or software has been tampered, and aborts the startup if some sort of unauthorized activity is found, for realizing a security management in a hardware level.

FIG. 10 is a diagram schematically illustrating the configuration of a conventional personal computer (PC); FIG. 11 is a diagram schematically illustrating connections for a TPM in an information processing apparatus; and FIG. 12 is a diagram illustrating containing of a platform configuration registers (PCR) value in a conventional PC.

A PC 1001, i.e., an information processing apparatus, is disclosed in FIG. 10. The PC includes an operating system (OS) 1002, an OS loader 1003, firmware 1004, a central processing units (CPUs) 1005 as computation units, I/O cards 1006, and a TPM 1007.

The TPM 1007 includes a PCR 1008 and a hash engine 1011 (see FIG. 12). The hash engine 1011 is adapted to convert configuration information (binary code) of the PC 1001 into a unique value, known as a hash value, using a mathematical technique, known as a hash algorithm, and is implemented by a microprocessor, for example.

The configuration information may include, the code and settings of the firmware 1004, the code and settings of firmware of the extension cards 1006, and the code and settings of the OS loader 1003, for example.

These pieces of configuration information are hashed by the hash engine 1011 in the TPM 1007 provided in a system board SB #00 (see FIG. 12), and the resultant hash is stored in the PCR 1008 as a PCR value.

The PCR1008 is a register for storing information on the platform, and retains a hash value (PCR value) and the like generated by the hash engine 1011 described above. The PCR 1008 is embodied by a storage circuit, such as a memory device.

In the example depicted in FIG. 12, five storage areas of PCR 0 to PCR 5 are depicted in the PCR 1008, and a hashed value of the code of the firmware 1004 is stored in the PCR [0]. Similarly, a hashed value of the settings of the firmware 1004 is stored in the PCR [1], a hashed value of the code of the firmware of the extension cards 1006 is stored in the PCR [2], and a hashed value of the settings of the extension cards 1006 is stored in the PCR [3]. Furthermore, a hashed value of the code of the OS loader 1003 is stored in the PCR [4], and a hashed value of the settings of the OS loader 1003 is stored in the PCR [5].

The firmware 1004 collects the configuration information of the platform upon startup of the PC 1001, converts the configuration information to a PCR value (hash value, configuration measurement value) using the hash engine in the TPM 1007, and stores it in the PCR 1008.

Upon storing the PCR value to the PCR 1008, a hash of a PCR value that has been previously stored in the PCR 1008 and the value of the configuration information to be added is stored. The PCR value is hashed together with the value that was previously written, which makes tampering of the PCR value to a certain value difficult.

The TPM 1007 is connected to a south bridge 1009 in the PC 1001, as depicted in FIG. 11, such that the OS 1002 and the like can read a PCR value stored in the PCR 1008 in the TPM 1007 via the south bridge 1009.

In the PC 1001, whether or not the configuration of the platform is modified is detected using the PCR value read from the PCR 1008. Hereinafter, such a function for detecting whether the configuration is modified using the PCR value is referred as "configuration lock function".

With the configuration lock function, upon startup of the PC 1001, the firmware 1004 stores configuration information of the system board into the TPM 1007. The configuration information is hashed by the hash engine 1011 in the TPM 1007, and the resultant hash is stored in the PCR 1008 as a PCR value.

The configuration lock function can assume two states: the locked and unlocked states. When the PC 1001 starts in the unlocked state, the OS 1002 reads the PCR value stored in the PCR 1008 in the TPM 1007 and saves it into a hard disk drive (HDD) 1010 (see Arrow A in FIG. 11). The unlocked state is the state wherein whether the configuration is modified is not checked upon startup of the PC 1001.

In contrast, when the PC 1001 starts in the locked state, the OS 1002 reads the PCR value stored in the HDD 1010 and compares the PCR value stored in the HDD 1010 with the PCR value stored in the PCR 1008 in the TPM 1007 (see Arrow B in FIG. 11). The locked state refers to the state wherein whether the configuration is modified is checked upon startup of the PC 1001.

In the locked state, if the PCR value stored in the PCR 1008 in the TPM 1007 match the PCR value stored in the HDD 101, the OS 1002 determines that the configuration of the PC 1001 has not been modified and starts the PC 1001 normally. Otherwise, if the PCR values do not match, the OS 1002 determines that the configuration of the PC 1001 has been modified and aborts any subsequent processing (startup processing) of the OS 1002 or issues a warning to an operator, for example.

The processing upon startup of the conventional PC 1001 will be described with reference to the flowchart (steps A10 to A100) depicted in FIG. 13.

When the PC 1001 is powered on, the firmware 1004 stores configuration information in the TPM 1007. The configuration information is hashed by the hash engine 1011 in the TPM 1007, and the resultant hash is stored in a PCR 1008 as a PCR value (Step A10).

In the unlocked state, the OS 1002 reads the PCR value from the PCR 1008 in the TPM 1007 and saves it into the HDD 1010 (Step A20).

The OS 1002 changes the PC 1001 from the unlocked state to the locked state (Step A30), and the PC 1001 is rebooted (Step A40).

During this reboot process, the firmware 1004 stores the configuration information in the TPM 1007. The configuration information is hashed by the hash engine 1011 in the TPM 1007, and the resultant hash is stored in a PCR 1008 as a PCR value (Step A50).

The OS 1002, in the locked state, reads the PCR value from the PCR 1008 in the TPM 1007 (Step A60), and compares the PCR value read from the TPM 1007 with the PCR value stored in the HDD 1010 (Step A70).

More specifically, the OS 1002 determines whether the PCR value stored in the HDD 1010 matches the PCR values read from the TPM 1007 (Step A80). If the PCR values do not match (see the NO route in Step A80), the OS 1002 determines that the configuration of the PC 1001 has been modified and aborts the startup of the PC 1001 or issues a warning to an operator (Step A100).

In contrast, if the PCR values match (see the YES route in Step A80), the OS 1002 starts the PC 1001 normally by continuing execution of the subsequent startup processing (Step A90).

Let's assume the case wherein a system board including a TPM as described above is applied to a server system having multiple system boards.

In server systems used in a backbone system, higher availability and operations with flexible allocation of resources (hardware resources) are required. As a technique to achieve such high availability and flexible allocation of resources, a function has been used in a server system in which a single system is divided into multiple domains (partitions), and a respective operating system is executed on each of the domains. Such a function is known as "multi partition function".

In operation of server systems in mission critical applications, it is required that processing can be continued even when any of multiple system boards experiences an error (failure), without causing any relay in the business operations.

In order to meet such a requirement, a technique is known wherein system boards are swapped if an error occurs in one system board. More specifically, upon a subsequent reboot of a partition including the failed system board, the failed system board is swapped with a spare system board of a similar configuration.

Since this spare system board includes firmware of the same version and the hardware (such as a CPU and memory) in the same configuration as those in the system boards being operated, the configuration within the partition is maintained even after the system boards are swapped.

However, TPMs are provided uniquely to the respective system boards, and each hash engine generates a hash value using a hash that is unique to each TMP. Accordingly, even if the same configuration information is passed from the firmware, the respective TPMs generate different PCR values.

More specifically, since the TPMs provided in system boards are also swapped during swapping of the system boards, a different PCR value will be stored in the PCR 1008 although the system board has the same configuration and the same configuration information is input.

Accordingly, in a conventional server, when the configuration lock function of the TPMs is enabled, the OS is not started on a spare system board after a system board experiencing some sort of error is swapped with the spare system board. This may have negative impact on operations of the server system. On the other hand, if the configuration lock function is disabled for operating the server system smoothly, the TPM function for detecting tampering and the like of the platform is not exploited, making improvement in the reliability of the system difficult.

Patent Reference 1: Japanese Laid-open Patent Publication No. 2006-323814

Patent Reference 2: Japanese Laid-open Patent Publication No. 2005-301550

SUMMARY

According to an aspect of the embodiment, an information processing apparatus includes a plurality of processing units each having a hashing unit that performs a hash operation, a startup control unit that controls startup of the information processing apparatus, and a hardware resource, the information processing apparatus including: a configuration information collection unit that collects configuration information for respective hardware resources provided in the plurality of processing units; a configuration register control unit that stores a configuration register value generated by performing the hash operation, by a hashing unit in the corresponding processing unit, for the collected configuration information of the hardware resource for each processing unit, to a configuration register provided in a startup control unit of the corresponding processing unit; a storage unit that stores the configuration register values read from the respective configuration registers by the configuration register control unit, by relating the configuration register values to the startup control unit in the corresponding processing unit, when the information processing apparatus is started without any configuration modification being detected; a configuration register value obtaining unit that obtains configuration register values stored in the respective configuration register, when the information processing apparatus is started with configuration modification being detected; a comparison unit that compares the obtained configuration register values with the stored configuration register values; and an operation control unit that continues startup processing of the information processing apparatus when the comparison unit detects any matched pair of an obtained configuration register value and stored configuration register value.

According to another aspect of the embodiment(s), a method of starting an information processing apparatus includes a plurality of processing units each having a hashing unit that performs a hash operation, a startup control unit that controls startup of the information processing apparatus, and a hardware resource, the method including: determining whether to detect configuration modification of the information processing apparatus upon startup of the information processing apparatus; collecting configuration information of hardware resources in the respective processing units; performing a hash operation on the collected configuration information of a hardware resource, and storing a configuration register value generated by the hash operation in a configuration register provided in the startup control unit in the corresponding processing unit; obtaining configuration register values stored in the respective configuration registers when the information processing apparatus is started with configuration modification being detected; comparing the obtained configuration register values with the stored configuration register values; and continuing startup processing of the information processing apparatus when any matched pair of a configuration register value and a stored configuration register value is detected at the comparing.

According to a further aspect of the embodiment(s), a non-transitory computer-readable medium storing a startup program for directing an information processing apparatus including a computing unit that performs computing and a plurality of processing units each including a hashing unit that performs a hash operation, a startup control unit that controls startup, and a hardware resource to perform a process, the process including: determining to detect configuration modification of the information processing apparatus upon startup of the information processing apparatus; collecting a configuration information of hardware resources in the respective processing units; performing a hash operation on the collected configuration information of a hardware resource, and storing a configuration register value generated by the hash operation in a configuration register provided in the startup control unit in the corresponding processing unit; obtaining configuration register values stored in the respective configuration registers when the information processing apparatus is started with configuration modification being detected; comparing the obtained respective configuration register values with the stored configuration register values; and continuing startup processing of the information processing apparatus when any matched pair of an obtained configuration register value and a stored configuration register value is detected at the detecting.

The object and advantages of the invention will be realized and attained by means of the elements and combinations particularly pointed out in the appended claims. It is to be understood that both the foregoing general description and the following detailed description are exemplary and explanatory and are not restrictive of the embodiment, as claimed.

BRIEF DESCRIPTION OF THE DRAWINGS

FIG. 4 is a diagram illustrating an example of configuration information to be stored in a PCR;

FIG. 13 is a flowchart illustrating processing upon startup in a conventional PC.

DESCRIPTION OF EMBODIMENTS

Hereinafter, an embodiment of an information processing apparatus, a startup control method, and a startup program will be described with reference to the drawings.

Figure 1:
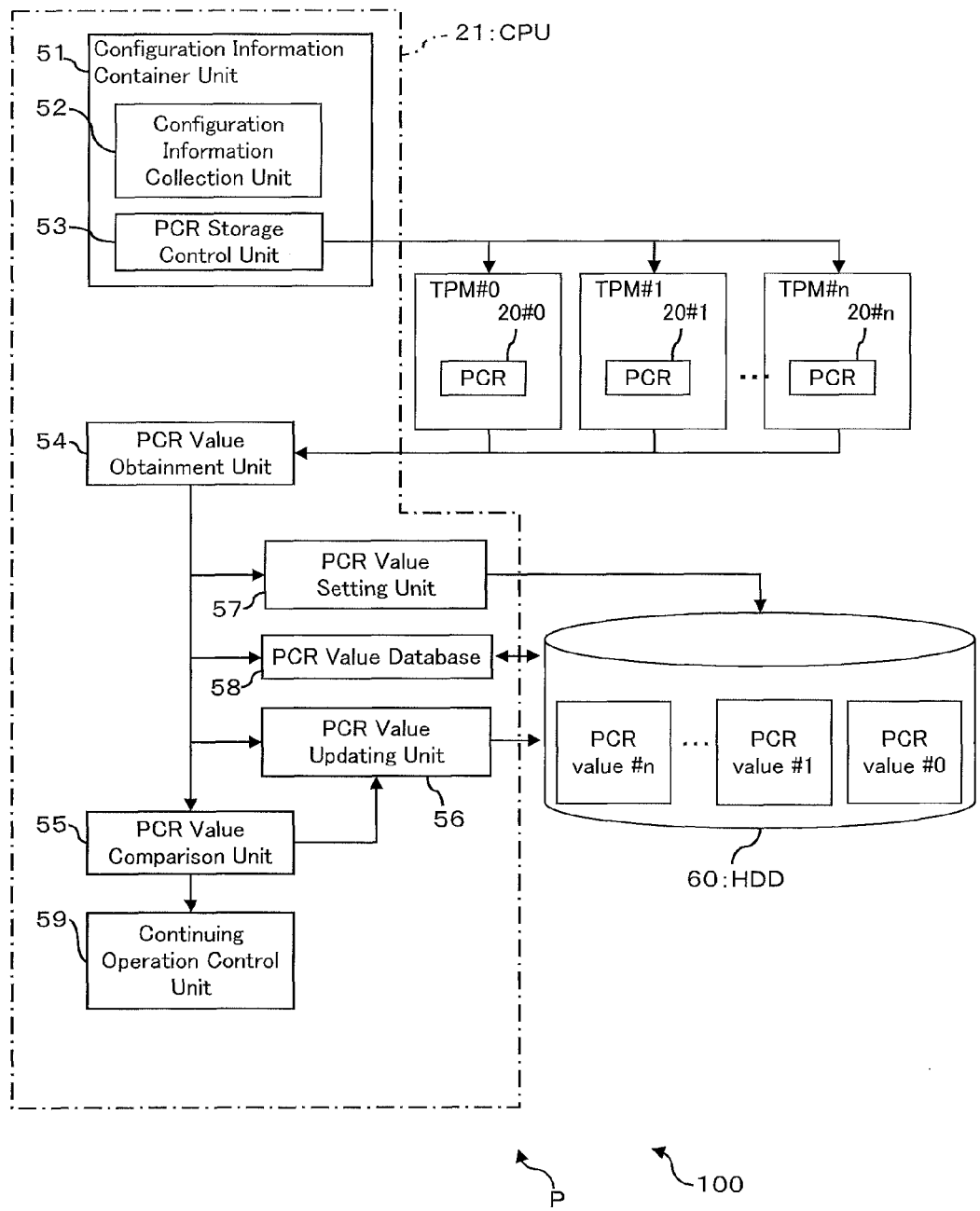
FIG. 1 is a diagram schematically illustrating the functional configuration in a server as one example of an embodiment.
Figure 2:
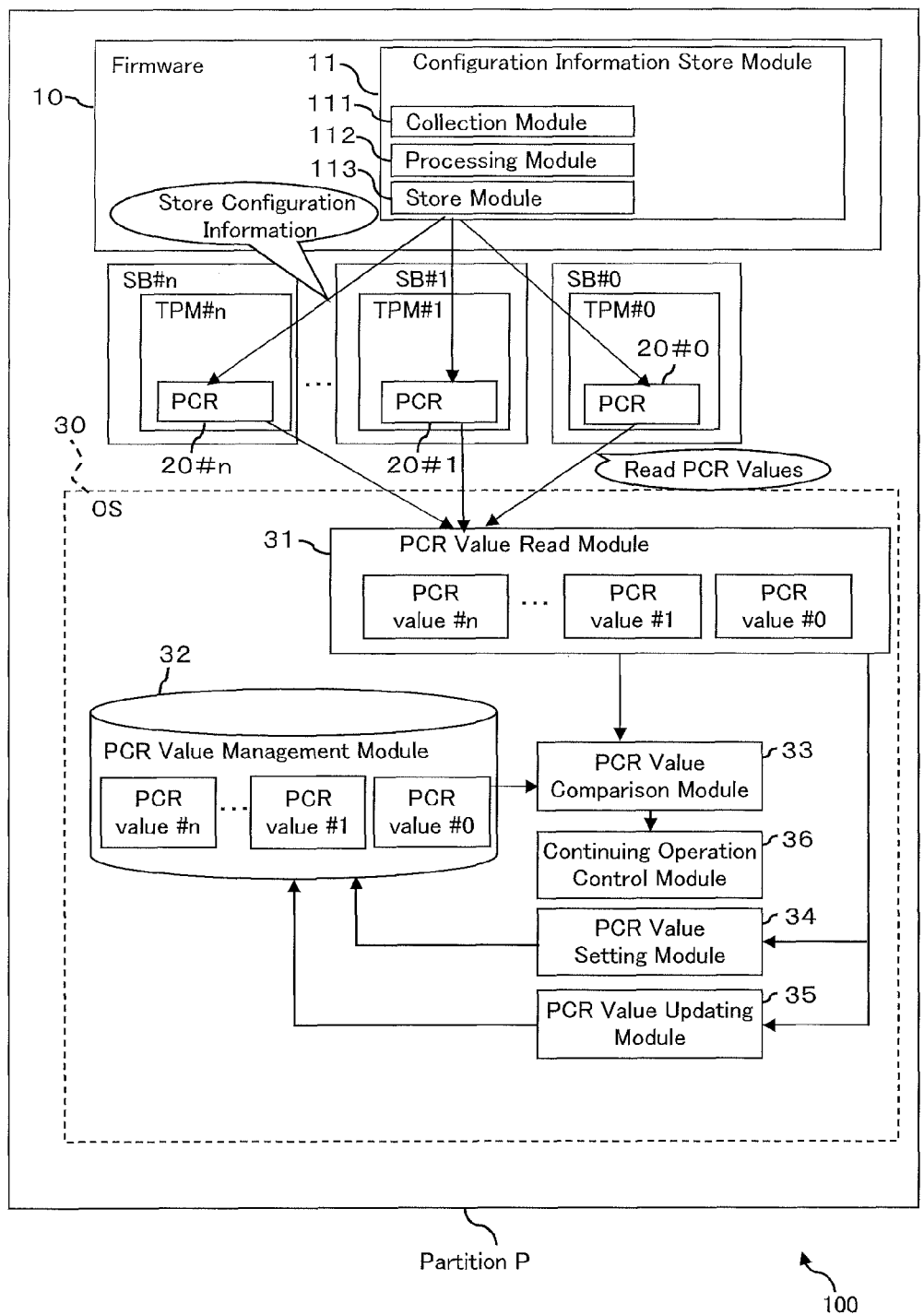
FIG. 2 is a diagram schematically illustrating the program configuration in a partition in a server as one example of an embodiment.

FIG. 1 is a diagram schematically illustrating the functional configuration in a server as one example of an embodiment; FIG. 2 is a diagram schematically illustrating the program configuration in a partition in the server as one example of an embodiment; and FIG. 3 is a diagram schematically illustrating the configuration of partitions.

A server 100, as one example of the present embodiment, is an information processing apparatus (computer) including a plurality of (n; "n" is an integer) system boards SB #0 to SB #n, as processing units, each having a security function module (TPM) as a startup control unit, as depicted in FIG. 3.

The server 100 is operated in a backbone system, for example, and is configured to include CPUs 21 as a computation unit, memory units (not illustrated), input/output units 42, and has a partitioning function for providing a system with a partition structure.

Figure 3:
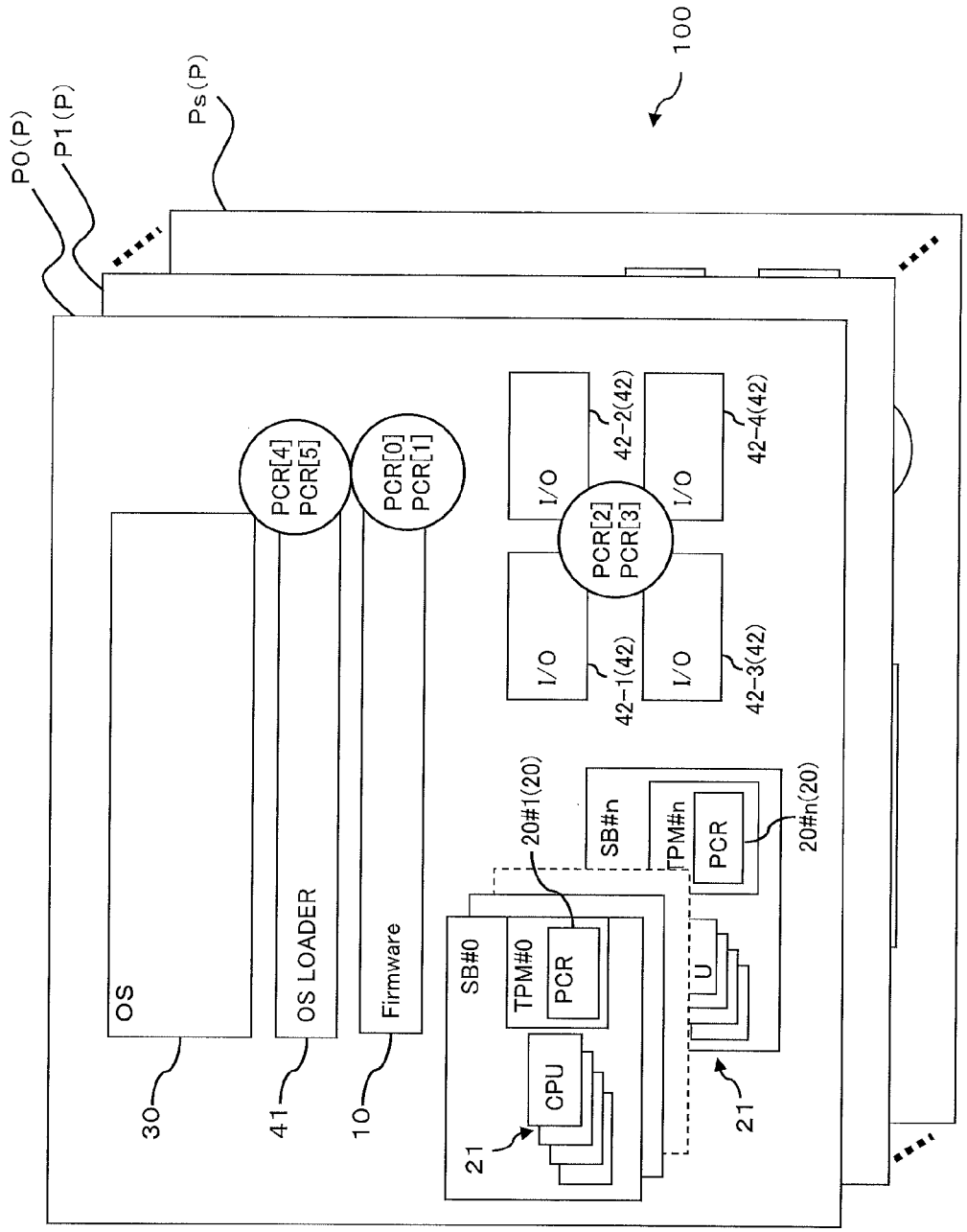
FIG. 3 is a diagram schematically illustrating the configuration of partitions in a server as one example of an embodiment.

In this server 100, a plurality of partitions P0 to Ps ("s" is an integer) may be configured by combining the CPUs 21, the memory units, and the I/O units 42, as desired, using the partitioning function, as depicted in FIG. 3.

Note that one of the reference symbols P0 to Ps is used when a reference to a specific one of the multiple partitions is required to be made while the reference symbol P is used when reference is made to any of the partitions.

Each partition P is configured to include an OS 30, an OS loader 41, firmware 10, system boards SB #0-#n, and I/O units 42-1 to 42-4, as depicted in FIG. 3.

Here, a partition P is a unit wherein the OS 30 is operated, and a single partition P is provided with at least one system board SB. In addition, firmware 10 is provided for the respective partitions P.

The I/O units 42-1 to 42-4 are extension cards, and in the example depicted in FIG. 3, four I/O units 42-1 to 42-4 are provided.

Note that the reference symbol 42-1, 42-2, 42-3, or 42-4 is used hereinafter for referring to a specific one of the multiple I/O units while the reference symbol 42 is used when reference is made to any of the I/O units.

While the partition P is configured to include n system boards SBs #0-#n and the four I/O units 42-1 to 42-4 in the example depicted in FIG. 3, this is not limiting. For example, more or less I/O units 42 may be provided. In addition, while four CPUs 21 are provided in each system board in the example depicted in FIG. 3, this is not limiting. More or less CPUs 21 may be provided and various modification may be made without departing from the spirit of the present embodiment.

Figure 7:
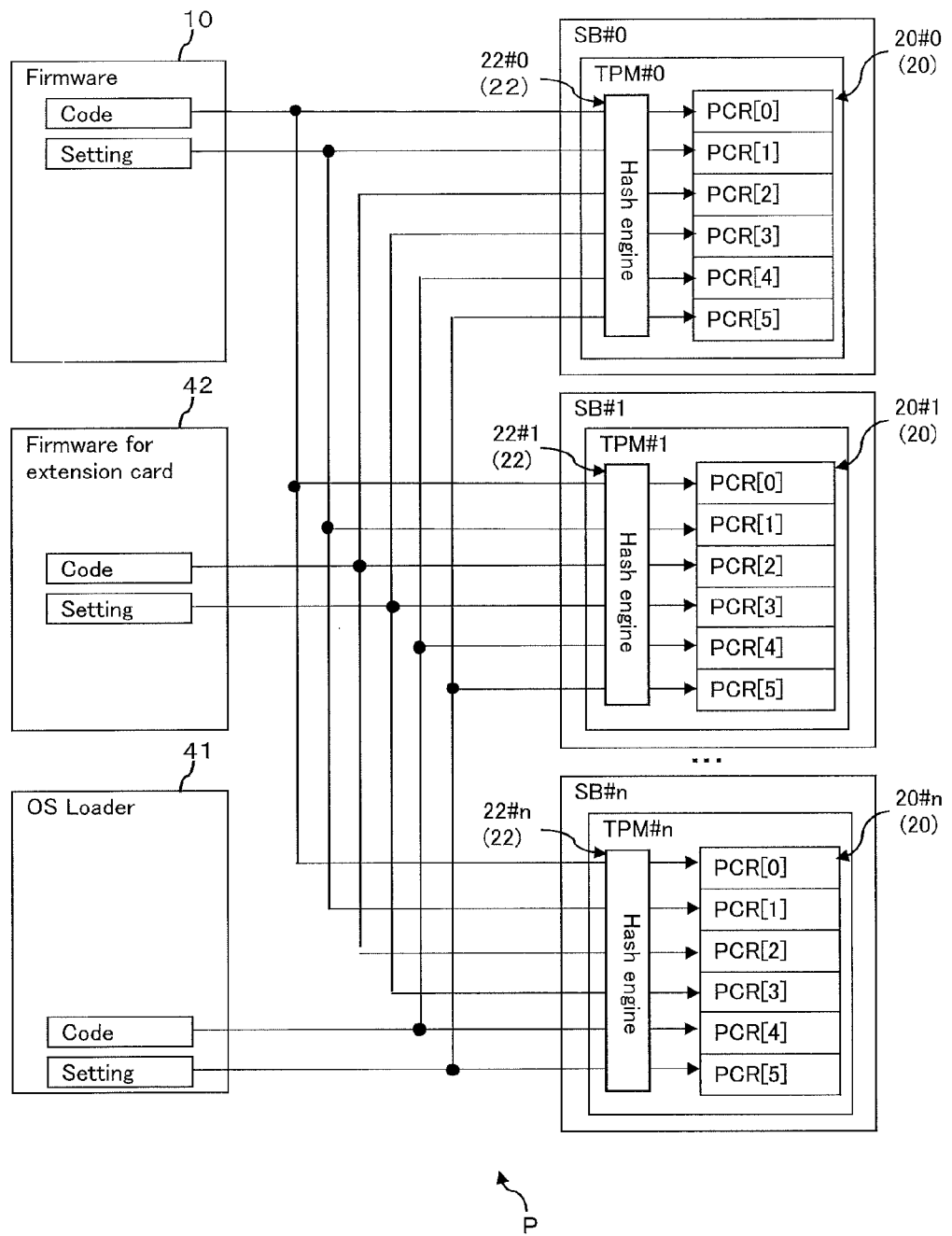
FIG. 7 is a diagram illustrating storage processing by a configuration information storage unit of configuration information into PCRs in a server as one example of an embodiment.

A TPM is a security chip compliant with the standard defined by the Trusted Computing Group (TCG), i.e., a standardization organization, and includes a PCR 20 as configuration register and a hash engine 22 as a hashing unit (see FIG. 7). Note that the TPMs are configured in accordance with the TCG standard, and the description of the detailed configurations and functions thereof will be omitted.

FIGS. 2 and 3 depict an example wherein a TPM #1 is provided in system board SB #1, a TPM #2 is provided in system board SB #2, and a TPM #n is provided in system board SB #n.

Note that the reference symbol #0, #1, or #n is used hereinafter for referring to a specific one of the multiple TPMs while the reference symbol TPM is used when reference is made to any of the TPMs.

In addition, FIG. 3 depicts an example wherein a TPM #0 and multiple CPUs 21 are provided in a system board SB #0, a TPM #1 and multiple CPUs 21 are provided in a system board SB #1, and a TPM #n and multiple CPUs 21 are provided in a system board SB #n.

In FIG. 2, components in the system board SB other than the TPM are omitted from illustration. Similarly, in FIG. 3, components other than the TPM and the CPUs 21 are omitted from illustration.

In the drawings, the reference symbols ending with #0, #1, or #n are related to other reference symbols ending with the same characters. For example, in the above-described configuration, the TPM #0 is provided in the system board SB #0 while the TPM #n is provided in the system board SB #n.

Figure 11:
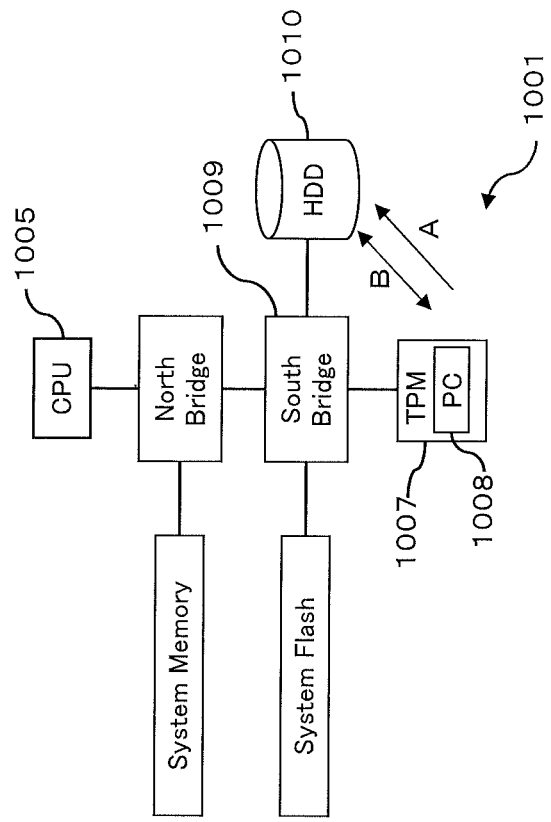
FIG. 11 is a diagram schematically illustrating connections for a TPM in an information processing apparatus.
Figure 12:
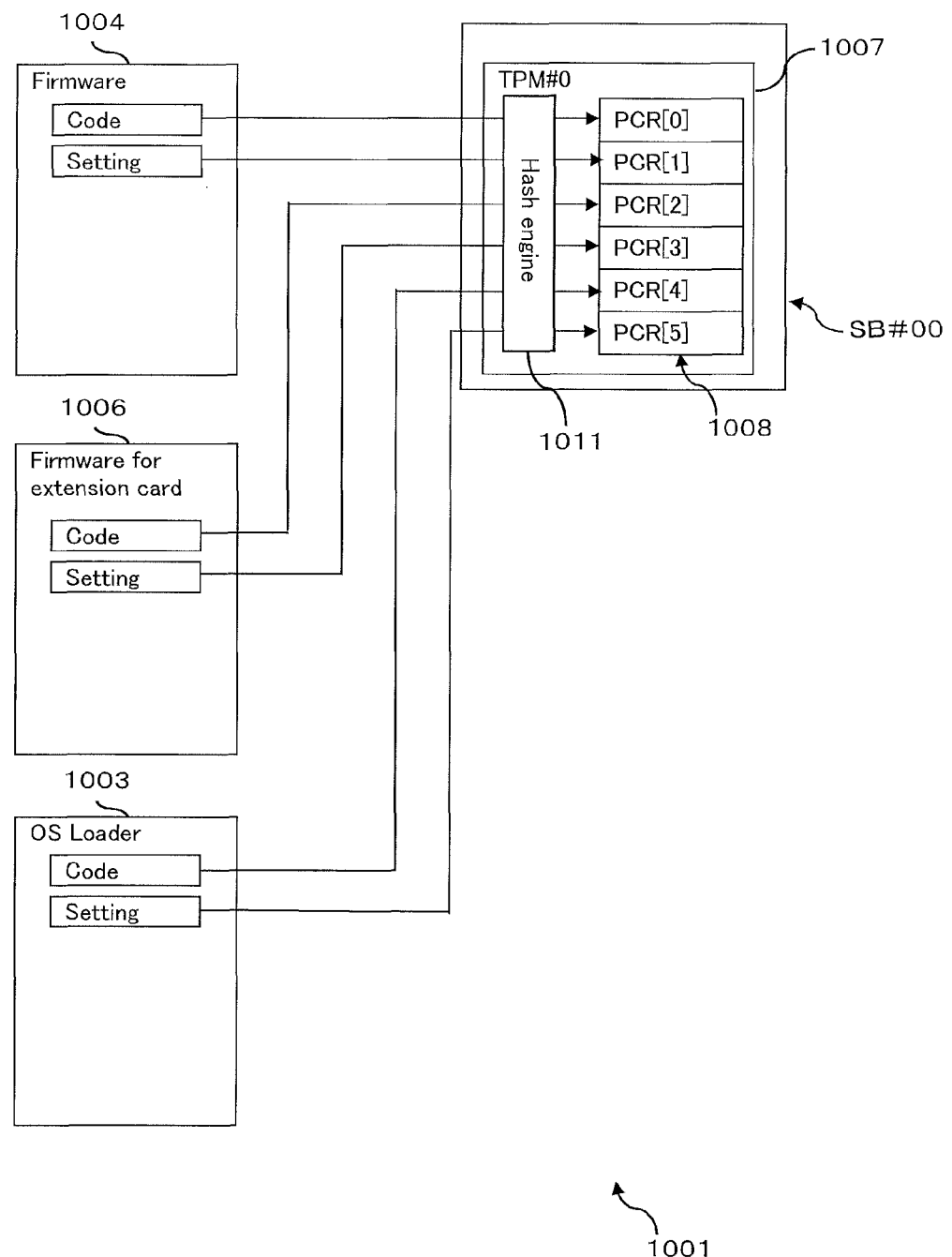
FIG. 12 is a diagram illustrating how a PCR value is stored in a conventional PC.

Furthermore, the TPMs are connected to a south bridge, similar to the configuration depicted in FIG. 11.

Each hash engine 22 is adapted to convert configuration information (binary code) of the partition P into a unique value (digest value), known as a hash value, using a mathematical technique, known as a hash algorithm, and is implemented by a microprocessor (not illustrated), for example. The hash value (configuration information) generated by the hash engine 22 is written into the PCR 20 as a PCR value.

Note that configuration information is written to the PCR 20 in response to firmware 10 or the like issuing a certain command (for example, TPM_Extend) to a TPM, for example, the details of which will be described later.

In addition, particular methods of hashing of configuration information by a hash engine 22 in a TPM and storing the hashed configuration information to the PCR 20 are done in accordance with the TCG standard, and detailed descriptions thereof will be omitted.

The PCR 20 is a register for storing information on the platform, and retains a PCR value and the like generated by the hash engine 22 described above. The PCR 20 is embodied by a storage circuit, such as a memory device.

FIG. 4 is a diagram illustrating an example of configuration information to be stored in a PCR. In the example depicted in FIG. 4, six storage areas of PCR [0] to PCR [5] are depicted in the PCR 20. In the example depicted in FIG. 4, a PCR value generated for the code of the firmware 10, as the target for measurement, is stored in the PCR [0]. Specifically, information indicating the version or the like of the firmware 10 is used.

A PCR value generated for the settings of the firmware 10, as the target for measurement, is stored in the PCR [1]. Specifically, processor microcode upgrades, at least part of internal data of the firmware stored in a non-volatile random access memory (non-volatile RAM; NVRAM), and the like are used.

A PCR value generated for the code of the firmware of an extension card, as the target for measurement, is stored in the PCR [2]. Specifically, the code of control firmware of a SCSI (small computer system interface) card and the like are used.

A PCR value generated for the settings of the firmware of an extension card, as the target for measurement, is stored in the PCR [3]. Specifically, multi initiator settings and the like of the SCSI card are used.

A PCR value generated for the settings of the firmware of an extension card, as the target for measurement, is stored in the PCR [4]. Specifically, a master boot record (MBR), a grand unified bootloader (GRub), and the like are used.

A PCR value generated for the settings of the firmware of an extension card, as the target for measurement, is stored in the PCR [5]. Specifically, boot device information, boot path setting information, and the like are used.

While six storage areas of the PCR [0] to PCR [5] in the PCR 20 are illustrated in this embodiment, this is not limiting and various modifications may be made as long as such modifications are compliant with the TCG standard.

For each TPM, a value that has been previously stored in the PCR 20 and a value to be stored there are combined together in the TPM to generate a PCR value, and the combined value is hashed by the TPM. For example, in order to store configuration information to the PCR [0], a value that has been previously stored in the PCR [0] and a value to be stored there are combined and hashed by the TPM, which is then stored to the PCR [0].

The system boards SB #0-#n are circuit boards wherein important electronic components for constructing an information processing apparatus, such as CPUs 21 and memory devices, are mounted, and are respectively configured to include the CPUs 21, a TPM, memory devices and interfaces, which are not illustrated, on the circuit boards.

Note that the reference symbol SB #0, SB #1, or SB #n is used hereinafter for referring to a specific one of the multiple system boards while the reference symbol SB is used when reference is made to any of the system boards.

In addition, in a partition P, a CPU 21 in a system board SB among the multiple system boards SB in this partition P, which has been configured to function as primary (primary system board SB), executes the firmware 10 and the OS 30 upon startup of the partition P. Thereby, the CPU 21 functions as a configuration information storage unit 51 (a configuration information collection unit 52, and a PCR storage control unit 53 as a configuration register control unit), a PCR value obtainment unit 54 as a configuration register value obtainment unit, a PCR value comparison unit 55, a PCR value updating unit 56, a PCR value setting unit 57, a PCR value database 58, and a continuing operation control unit 59, which will be described later.

Note that in the configuration information storage unit 51 (the configuration information collection unit 52, and the PCR storage control unit 53), the PCR value obtainment unit 54, the PCR value comparison unit 55, the PCR value updating unit 56, the PCR value setting unit 57, the PCR value database 58, and the continuing operation control unit 59, the primary system board SB executing the firmware 10 and the primary system board SB executing the OS 30 may be different system boards SB.

If multiple CPUs 21 are provided in the primary system board SB, the CPU 21 among the multiple CPUs 21 in this system board SB, which has been configured to function as primary (primary CPU), functions as the configuration information storage unit 51 (the configuration information collection unit 52, and the PCR storage control unit 53), the PCR value obtainment unit 54, the PCR value comparison unit 55, the PCR value updating unit 56, the PCR value setting unit 57, the PCR value database 58, and the continuing operation control unit 59.

Note that the system board SB among the multiple system boards SB having the smallest identification number may be set as a primary system board SB, for example. Similarly, the system CPU 21 among the multiple system CPUs 21 provided in the primary system board SB having the smallest identification number may be set as a primary CPU 21, for example. Hereinafter, the "CPU 21" sometimes refers to the primary CPU 21 for simplicity.

In this server 100, the partition P may be selectively started in two states: the locked and unlocked states. Here, in the locked state, whether or not the configuration is modified is checked (detected) using a TPM upon startup of the partition P (configuration lock function). In contrast, in the unlocked state, whether or not the configuration is modified is not checked upon startup of the partition P. In addition, the OS 30 switches between the locked state and the unlocked state, for example.

Note that the system boards SB #0 to SB #n have substantially similar configurations in the server 100, and are configured to have firmware 10 of the same version and hardware (e.g., a CPU 21 and memory device) in the same configuration. In addition, in the partition P, a spare system board SB #R is provided in the case of an error (failure) occurs in one of the system boards SB #0 to SB #n, the spare system board SB #R being swappable with the failed system board SB (see FIG. 9).

The partition P has a swap function which, in the case where some sort of error is detected in one of the system boards SB #0 to SB #n, swaps the failed system board SB with the spare system board SB #R, upon the subsequent reboot of the partition P.

If an error occurs in one of system boards SB in the partition P while this partition P is being operated, the failed system board SB is isolated and the partition P including the spare system board SB #R is started, upon the subsequent reboot of the partition P.

The spare system board SB #R includes firmware 10 in the same version and the same hardware configuration as those of the system boards SB #0 to SB #n. Thus, it is ensured that the configuration within the partition P is maintained when one of the system boards SB #0 to SB #n is swapped with the spare system board SB #R. More specifically, even if the failed system board SB and the spare system board SB #R are swapped by the swap function, the configuration of the platform of the partition P is maintained.

The firmware 10 is a program for carrying out basic controls on the hardware, for example, and is executed on the CPU 21. The firmware 10 is stored in an NVRAM (not illustrated) or the like.

In addition, the firmware 10 includes a configuration information storage module 11, as depicted in FIG. 2. The configuration information storage module 11 is a program that is executed by the CPU 21 in order to embody the function as the configuration information storage unit (see FIG. 1). The configuration information storage module 11 is configured to include a collection module 111, a processing module 112, and a storage module 113.

The configuration information storage unit 51, if multiple TPMs (system boards SB) are present in the same partition, stores respective global configuration information on the platform for two or more TPMs among these multiple TPMs. Note that, in this embodiment, the configuration information storage unit 51 stores respective global configuration information on the platforms for all of the TPMs in the same partition. In other words, the configuration information storage unit 51 stores the same configuration information for all of the TPMs in the same partition.

The configuration information collection unit 52 is adapted to collect configuration information of system boards SB in the partition P. The configuration information collection unit 52 is embodied by the CPU 21 by executing the collection module 111 in the configuration information storage module 11.

The configuration information collection unit 52 collects the code of firmware 10 and the settings for the firmware 10 from the firmware 10 in the same partition P. Here, the code of the firmware 10 refers to information on the firmware 10, such as the version of the firmware 10, while the settings for the firmware 10 refers to processor microcode upgrade information, or internal data for the firmware 10 stored in an NVRAM.

In addition, the configuration information collection unit 52 collects the code of firmware of an extension card and the settings for the firmware of the extension card, as configuration information, from the I/O units 42 in the same partition P. Note that the firmware code of the extension card is a driver on an I/O card, for example.

Furthermore, the configuration information collection unit 52 collects the code of the OS loader 41 and the settings for the OS loader 41, as configuration information, from the OS loader 41 in the same partition P. Note that the code of the OS loader refers to a master boot record (MBR) or GRub or the like, while the settings for the OS loader refer to boot device information or boot path setting information, for example.

The PCR storage control unit 53 is adapted to process the configuration information collected by the configuration information collection unit 52 into a format that can be passed to a TPM, e.g., generates configuration information in a predetermined data length, for example. Note that this data length for configuration information is the data length specified by the TCG, and is 20 bytes in this embodiment. In addition, processing of configuration information into a predetermined data length may be done by various techniques, and detailed description therefore will be omitted.

In addition, the PCR storage control unit 53 stores the configuration information processed into a data length of 20 bytes to the respective PCRs 20 in the multiple TPMs in the same partition P. In addition, the PCR storage control unit 53 is adapted to hash configuration information by a hash engine 22 that is unique to each TPM and stores the hashed value (PCR value) to the corresponding PCR 20 in each TPM.

Specifically, the PCR storage control unit 53 passes the configuration information processed into a data length of 20 bytes to each TPM, as well as issuing a TPM_Extend command to these TPMs. In addition, in a TPM, upon processing the TPM_Extend command, hashing of configuration information is performed by the hash engine 22.

A CPU 21 functions as the above-described PCR storage control unit 53 by executing the processing module 112 and the storage module 113 in the firmware 10. In other words, by executing the storage module 113, the CPU 21 functions as a PCR value generation control unit that hashes the configuration information collected by the configuration information collection unit 52 using a corresponding unique hash engine by each TPM in two or more system boards, thereby generating a PCR value.

Figure 5:
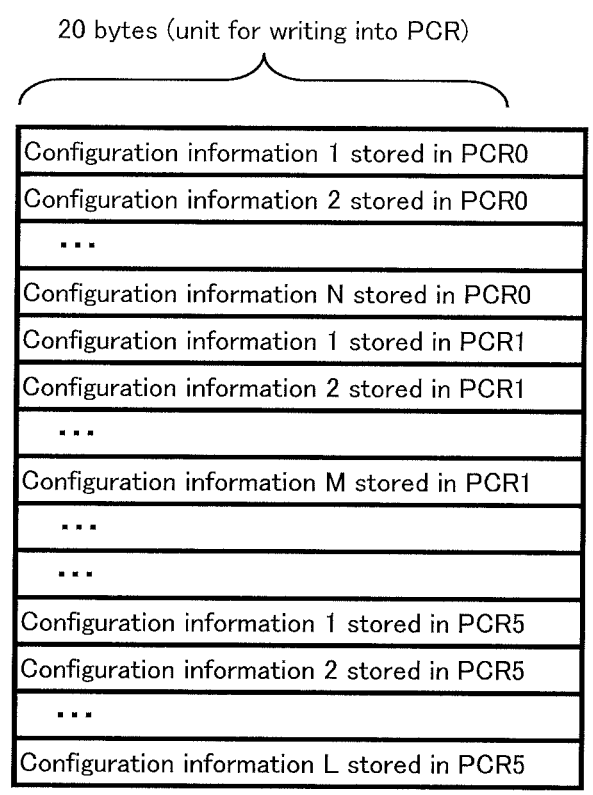
FIG. 5 is a diagram schematically illustrating an example of configuration information stored in a PCR.

FIG. 5 is a diagram schematically illustrating an example of configuration information stored in a PCR. In the example depicted in FIG. 5, it is depicted that N pieces of configuration information, i.e., configuration information 1 to N, are sequentially written to the PCR [0], for example, by the TPM_Extend command. Similarly, M pieces of configuration information, i.e., configuration information 1 to M, are sequentially written to the PCR [1] and L pieces of configuration information, i.e., configuration information 1 to L, are sequentially written to the PCR [5], by the TPM_Extend command. In addition, in this embodiment, respective pieces of configuration information are written into the RCR 20 in unit of 20 bytes.

Figure 6:
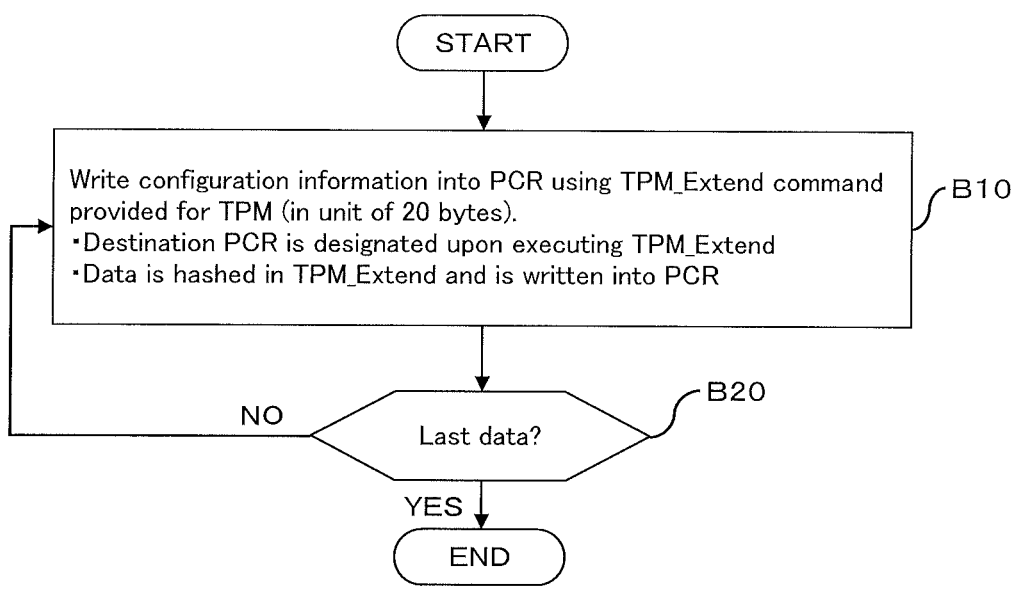
FIG. 6 is a flowchart illustrating how configuration information is stored into a PCR in a server as one example of an embodiment.

Next, how configuration information is stored into a PCR 20 in the server as one example of an embodiment will be described with reference to the flowchart depicted in FIG. 6 (Steps B10 and B20).

The PCR storage control unit 53 selects one of pieces of configuration information as depicted in FIG. 5, and writes it into a PCR in unit of 20 bytes, using a TPM_Extend command provided in the TPM (Step B10).

In this step, the PCR storage control unit 53 specifies a particular PCR 20 to which the configuration information is to be written, when executing the TPM_Extend command. In addition, the hashing of the configuration information is performed in the execution of the TPM_Extend command, and the resultant hashed PCR value is written to the PCR 20.

The PCR storage control unit 53 checks whether or not the piece of configuration information just written into the PCR 20 in Step B10 is the last data (Step B20). If the piece is not the last data, in other words, if there remains more configuration information to be written (see the NO route in Step B20), the flow returns to Step B10. Otherwise, if the piece of configuration information just written into the PCR 20 is the last data (see the YES route in Step B20), the flow ends.

The PCR storage control unit 53 then performs storage processing of the configuration information to a PCR 20 for all TPMs.

FIG. 7 is a diagram illustrating storage processing by the configuration information storage unit 51 of configuration information into a PCR 20 in a server as one example of an embodiment;

As depicted in FIG. 7, the configuration information storage unit 51 (the configuration information collection unit 52) obtains information on the code and the settings from the firmware 10. The configuration information storage unit 51 (the PCR storage control unit 53) then issues a TPM_Extend command, together with the configuration information, to the respective TPMs #0-#n in the system boards SB #0 to SB #n. In response, the respective hash engines 22 #0-22#n in the TPMs #0-#n hash the configuration information, and store the hashed values to the PCR [0] and the PCR [1] in the respective PCRs #0-#n, as PCR values.

Similarly, the configuration information storage unit 51 (the configuration information collection unit 52) obtains information on the code and the settings from an extension card (I/O unit 42). The configuration information storage unit 51 (the PCR storage control unit 53) then issues a TPM_Extend command, together with the configuration information, to the respective TPMs #0-#n in the system boards SB #0 to SB #n. In response, the respective hash engines 22 #0-22#n in the TPMs #0-#n hash the configuration information, and store the hashed values to the PCR [2] and the PCR [3] in the respective PCRs #0-#n, as PCR values.

Furthermore, the configuration information storage unit 51 (the configuration information collection unit 52) obtains information on the code and the settings from the OS loader 41. The configuration information storage unit 51 (the PCR storage control unit 53) then issues a TPM_Extend command, together with the configuration information, to the respective TPMs #0-#n in the system boards SB #0 to SB #n. In response, the respective hash engines 22 #0-22#n in the TPMs #0-#n hash the configuration information, and store the hashed values to the PCR [4] and the PCR [5] in the respective PCRs #0-#n, as PCR values.

The OS loader 41 is a program to start the OS 30, and is executed on the CPU 21. The OS loader 41 is stored in the start sector of the hard disk drive (HDD) 60, for example.

The OS 30 is basic software for embodying various functions in the server 100, and is executed on the CPU 21. The OS 30 is stored in a storage device, such as the HDD 60, for example.

In addition, the OS 30 includes a PCR value read module 31, a PCR value management module 32, a PCR value comparison module 33, a PCR value setting module 34, a PCR value updating module 35, and a continuing operation module 36, as depicted in FIG. 2. The CPU 21 functions as a PCR value obtainment unit 54, a PCR value management database 58, a PCR value comparison unit (comparison unit) 55, a PCR value setting unit 57, a PCR value updating unit (updating unit) 56, and a continuing processing unit 59, by executing the PCR value read module 31, the PCR value management module 32, the PCR value comparison module 33, the PCR value setting module 34, and PCR value updating module 35, respectively.

The PCR value obtainment unit 54 obtains PCR values from the respective PCRs 20 in two or more TPMs which store configuration information.

The PCR value obtainment unit 54 reads the PCR values from the respective PCRs 20 in the two or more TPMs, upon startup of the partition P (including upon reboot), irrespective of the state, i.e., the unlocked or locked state.

The PCR value database 58 is adapted to maintain the respective PCR values obtained by the PCR value obtainment unit 54. The PCR value database 58 has functions to store each PCR value to a certain location in the storage device (the HDD 60 in this embodiment), and read PCR values stored in the storage device. Furthermore, the PCR value database 58 reads a PCR value from the HDD 60 upon a request from the PCR value comparison unit 55 or the like, for example.

The PCR value database 58 maintains each PCR value obtained by the PCR value obtainment unit 54, by relating it to the corresponding source TPM or the system board SB.

The HDD 60 is a storage device that stores various kinds of pieces of information and programs. In addition, the HDD 60 stores PCR values #0-#n.

When a partition P (the server 100) is started in the unlocked state, each PCR value stored by the PCR storage control unit 53 in the respective PCRs is stored into the HDD 60, with being related to the respective TPMs. More specifically, the PCR value (first configuration register value) read from the PCR in the TPM #0 (first configuration register) is stored in the HDD 60, with being related to the TPM #0 (first startup control unit). Similarly, the PCR value (second configuration register value) read from the PCR in the TPM #n (second configuration register) is stored, with being related to the TPM #n (second startup control unit). Note that storage and reading of the respective PCR values to and from the HDD 60 are managed by the PCR value database 58.

The PCR value setting unit 57 makes each PCR value obtained by the PCR value obtainment unit 54 to be stored in the HDD 60, and makes it to be set and registered in the PCR value database 58.

The PCR value comparison unit (comparison unit) 55 is adapted to compare a PCR value obtained from the PCR 20 by the PCR value obtainment unit 54 with a PCR value stored in the HDD 60. For a PCR value obtained from the PCR 20 by the PCR value obtainment unit 54, the PCR value comparison unit 55 looks up the PCR value database 58, based on the source TPM of that PCR value. The PCR value comparison unit 55 obtains the PCR value corresponding to that TPM, from the multiple PCR values stored in the HDD 60.

The PCR value comparison unit 55 then compares the PCR value obtained from the PCR 20 by the PCR value obtainment unit 54 with the PCR value obtained from the HDD 60, each being related to this same TPM, to determine whether they match or not.

More specifically, the PCR value comparison unit 55 is adapted to compare a PCR value obtained by the PCR value obtainment unit 54 from a PCR 20 in each TPM, with a PCR value corresponding to that TPM, of the multiple PCR values stored in the HDD 60.

The PCR value comparison unit 55 compares, when the partition P (the server 100) is started in the locked state, the PCR value (first configuration register value) obtained by the PCR value obtainment unit 54 with the PCR value #0 (first configuration register value) stored in the HDD 60 related to the TPM #0 (first startup control unit), for the TPM #0. Similarly, the PCR value comparison unit 55 compares the PCR value (second configuration register value) obtained by the PCR value obtainment unit 54 with the PCR value #n (second configuration register value) stored in the HDD 60 related to the TPM #n (second startup control unit), for the TPM #n.

The result of the comparison by the PCR value comparison unit 55 is send to the continuing operation control unit 59.

If a PCR value obtained by the PCR value obtainment unit 54 does not match a corresponding PCR values stored in the HDD 60 for any of the TPMs during the comparison by the PCR value comparison unit 55, the continuing operation control unit 59 executes the subsequent operation. More specifically, the continuing operation control unit 59 determines that configuration (hardware or software) is modified in the partition P, and makes an error process to be executed.

Note that this error process aborts the startup processing by the OS 30 or issues an warning, for example, and is performed by executing a program, such as a module for the OS 30. This error process can be embodied by a variety of well-known techniques, and detailed descriptions of such techniques will be omitted.

In contrast, if a PCR value obtained by the PCR value obtainment unit 54 matches a corresponding PCR value stored in the HDD 60 for at least any one TPM of the multiple TPMs, the continuing operation control unit 59 inhibits execution of the error process and makes the OS 30 continue the startup processing for the partition P.

If the PCR value comparison unit 55 detects a match of the pair of the PCR value (first configuration register value) obtained by the PCR value obtainment unit 54 from a PCR in the TPM #0 and the PCR value (first configuration register value) stored in the HDD 60 related to the TPM #0, the continuing operation control unit 59 continues the startup processing for the partition P (the server 100). Or, if the PCR value comparison unit 55 detects a match of the pair of the PCR value (second configuration register value) obtained by the PCR value obtainment unit 54 from a PCR in the TPM #n and the PCR value (second configuration register value) stored in the HDD 60 related to the TPM #n, the continuing operation control unit 59 continues the startup processing for the partition P.

More specifically, if there is at least one matched pair of a PCR value obtained from a PCR 20 by the PCR value obtainment unit 54 and a PCR value stored in the HDD 60, in the multiple TPMs matches, the continuing operation control unit 59 determines that configuration of the platform in the partition P has not been modified.

Thereby, even if a part of system boards SB is swapped with a spare system board SB, the error process is not executed if there is at least one matched pair of PCR values in the system boards SB other than the swapped system boards SB. More specifically, if there is at least one matched pair of a PCR value stored in the PCR 20 of a TPM and a PCR value stored in the HDD 60 related to the TPM in the system boards SB other than the swapped system boards SB, no error process is executed. Consequently, the execution of the startup processing for that partition P is continued.

The PCR value updating unit 56 is adapted to update the PCR value related to that TPM in the HDD 60. If PCR values match for at least one of the multiple TPMs but some PCR values do not match doing the comparison by the PCR value comparison unit 55, the PCR value updating unit 56 updates the PCR value in the HDD 60 for the TPM having the unmatched PCR value.

Here, the term "PCR values match for at least one of the multiple TPMs" means that a PCR value obtained by the PCR value obtainment unit 54 matches a corresponding PCR value stored in the HDD 60, for the at least one of the multiple TPMs. In addition, the term "some PCR values do not match" means that another PCR value obtained by the PCR value obtainment unit 54 does not match the corresponding PCR value stored in the storage unit. Furthermore, updating of a PCR value is done by updating, for a TPM having an unmatched PCR value, a PCR value in the HDD 60 related to that TPM, with the corresponding PCR value obtained by the PCR value obtainment unit 54.

In addition, the PCR value updating unit 56 updates the PCR value in the HDD 60 related to the TPM having the unmatched PCR value, as well as reflecting this update to the PCR value database 58.

Consequently, when a part of the system boards SB in the partition P is swapped with a spare system board SB, the PCR value stored in the PCR 20 in the TPM of the swapped spare system board SB is registered in the HDD 60 with being related to that TPM.

Accordingly, when that partition P is started in the next time, a PCR value obtained by the PCR value obtainment unit 54 for that TPM will match a corresponding PCR value stored in the HDD 60.

The CPU 21 functions as the configuration information storage unit 51 (the configuration information collection unit 52 and the PCR storage control unit 53) described above by executing the above-described firmware 10. In addition, the CPU 21 functions as the PCR value obtainment unit 54, the PCR value setting unit 57, the PCR value comparison unit 55, the PCR value updating unit 56, the PCR value database 58, and the continuing operation control unit 59 described above by executing the OS 30.

Note that the program for implementing the functions as the elements indicated by the above-described reference symbol 51-59 are provided in the form recorded in a computer-readable recording medium.

More specifically, this program include a configuration information storage module 11, a PCR value read module 31, a PCR value management module 32, a PCR value comparison module 33, a PCR value setting module 34, a PCR value updating module 35, and a continuing operation module 36. Furthermore, the configuration information storage module 11 includes a collection module 111, a processing module 112, and a storage module 113.

In addition, flexible disks, CDs, DVDs, Blu Ray disks, magnetic disks, optical disks, magneto-optical disks, and the like may be used as this recording medium, for example. Note that CDs include CD-ROMs, CD-Rs, CD-RWs, and the like. In addition, DVDs include DVD-ROMs, DVD-RAMs, DVD-Rs, DVD-Rs, DVD-RWs, DVD-RWs, HD DVDs, and the like.

The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from to the storage device to the computer through a communication path.

Upon implementing the functions as the elements indicated by the above-described reference symbol 51-59, a program stored in an internal storage device (RAM or ROM) is executed by a microprocessor of a computer (CPU 21, in this embodiment). In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the server 100 and the partition P include a function as a computer.

In addition, the configuration information storage module 11, the PCR value read module 31, the PCR value management module 32, the PCR value comparison module 33, the PCR value setting module 34, the PCR value updating module 35, and the continuing operation module 36 may be provided as a driver.

Figure 8:
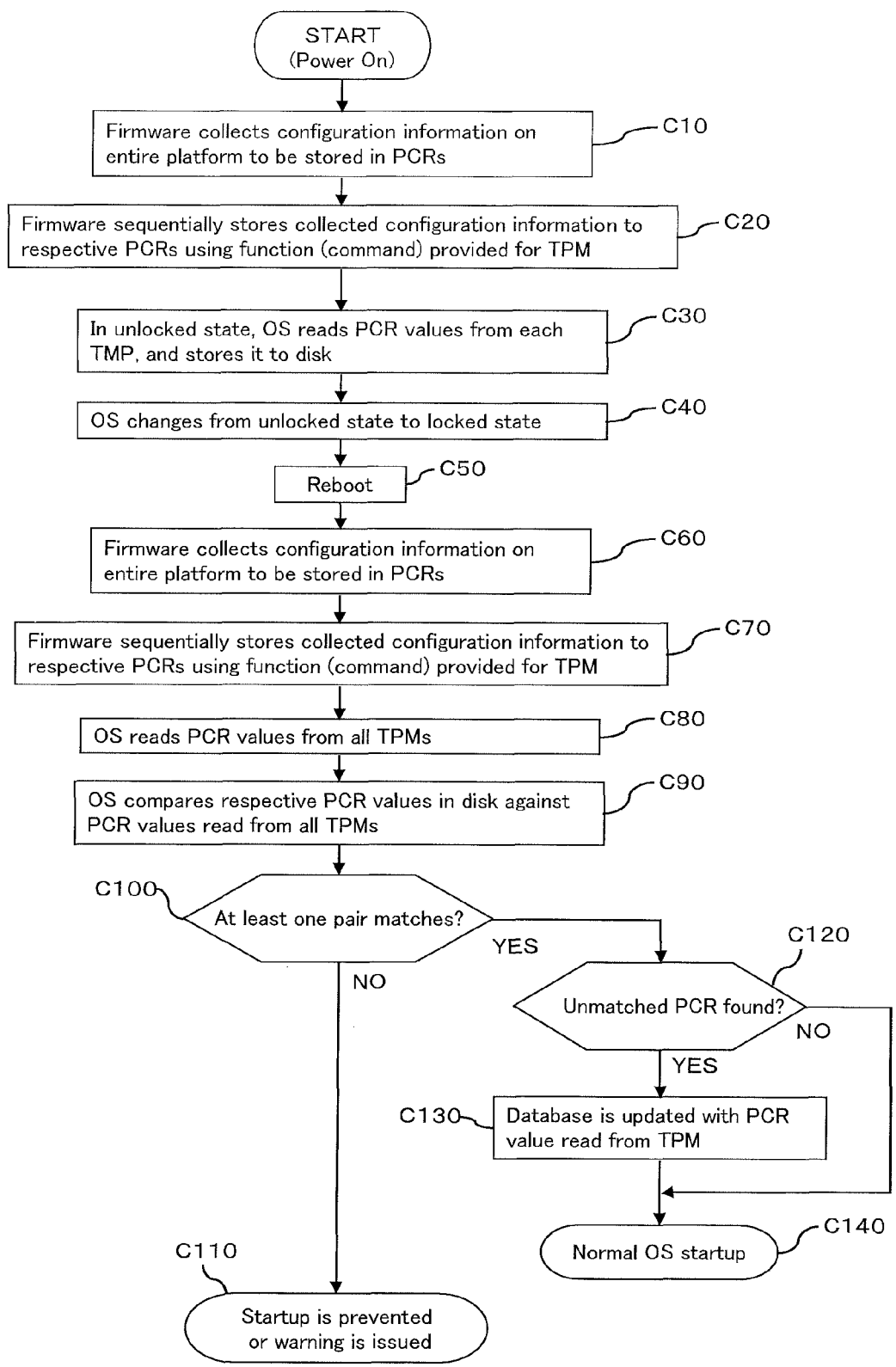
FIG. 8 is a flowchart illustrating processing upon startup of a partition in a server as one example of an embodiment.

Processing upon startup of the partition P in the server 100 configured as described above as one example of an embodiment will be described with reference to the flowchart depicted in FIG. 8 (Steps C10-C140).

When the server 100 is powered on, firmware 10 collects global configuration information (see FIG. 5) on the platform of a partition P (Step C10).

The firmware 10 then issues a TPM_Extend command to multiple TPMs (all TPMs in this embodiment) within the partition P, together with the collected configuration information. Consequently, the firmware 10 hashes the respective pieces of collected configuration information using the function (the hash engine 22 or the like) provided to each TPM, and stores the hashed information into the respective PCRs 20 (Step C20). The details of storing the configuration information to the PCRs have been described with reference to the flowchart in FIG. 6.

In the unlocked state, the OS 30 reads the respective PCR values from the PCRs 20 in the respective TPMs 20 and saves them into the HDD 60 (Step C30).

The OS 30 changes the partition P from the unlocked state to the locked state (Step C40), and the partition P is rebooted (Step C50). Thereafter, the partition P is operated in the locked state.

Upon the reboot of the partition P, the firmware 10 collects global configuration information on the platform of the partition P (Step C60). In addition, the firmware 10 issues a TPM_Extend command to multiple TPMs (all TPMs in this embodiment) within the partition P, together with the configuration information. Consequently, the firmware 10 hashes the respective pieces of collected configuration information using the function provided to each TPM, and stores the hashed information into the respective PCRs 20 (Step C70).

The OS 30, in the locked state, reads PCR values from a PCR 20 of a TPM (Step C80), and compares each PCR value stored in the HDD 60 with the corresponding PCR value read from the PCR 20 in the TPM (Step C90).

The OS 30 then checks whether there is at least one matched pair of a PCR value stored in the HDD 60 and a corresponding PCR value read from the TPM (Step C100). If there is no matched pair of PCR values during the comparison (see the NO route in Step C100), the OS 30 determines that the platform within the partition P has been modified. The OS 30 then executes an error process, such as aborting startup of the partition P or issuing a warning to the operator (Step C110).

Otherwise, there is at least one matched pair of a PCR value stored in the HDD 60 and a corresponding PCR value read from a TPM (see the YES route in Step C100), the OS 30 then checks whether or not there is at least one unmatched pair. More specifically, the OS 30 checks whether or not there is at least one unmatched pair of a PCR value stored in the HDD 60 and a corresponding PCR value read from a TPM (Step C120).

Here, if all pairs of a PCR value stored in the HDD 60 and a corresponding PCR value read from a TPM match (see the NO route in Step C120), the continuing operation control unit 59 continues the subsequent execution of the startup processing by the OS 30 to normally start the partition P (Step C140).

Otherwise, if there is at least one unmatched pair of a PCR value stored in the HDD 60 and a corresponding PCR value read from a TPM (see the YES route in Step C120), the PCR value updating unit 56 updates that PCR value. More specifically, the PCR value updating unit 56, for the TPM having the unmatched PCR value, updates the PCR value in the HDD 60 related to that TPM with the corresponding PCR value obtained by the PCR value obtainment unit 54 (Step C130). The flow then moves to Step C140.

Next, processing when an error occurs in one of the system boards SB in a partition P in the server 100 will be described. It is assumed that the configuration lock function by TPMs is enabled.

Figure 9A:
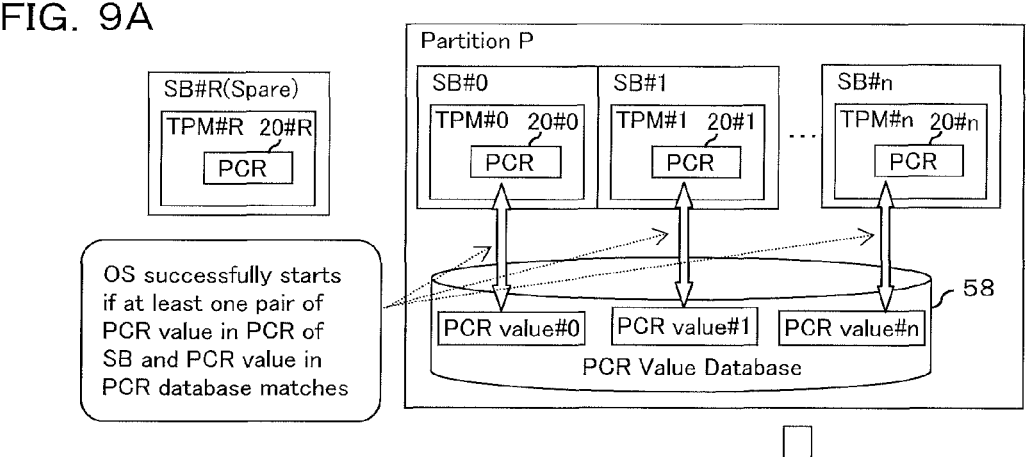
FIGS. 9A-9C are a diagram illustrating processing when system boards are swapped in a partition in a server as one example of an embodiment.
Figure 9B:
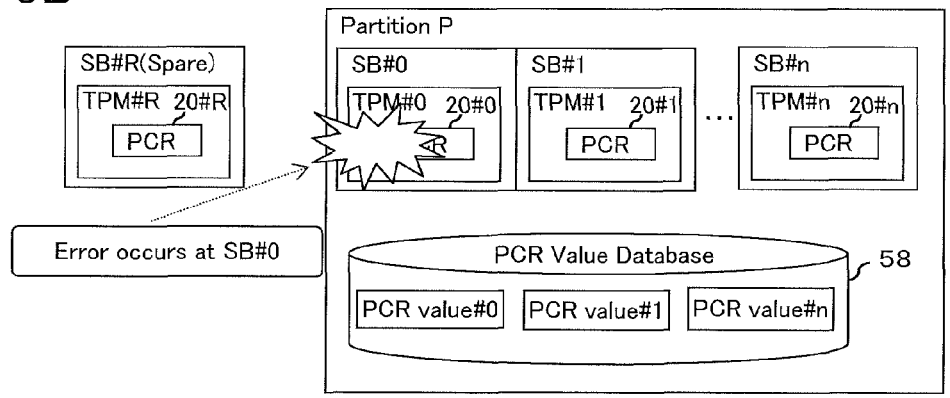
Figure 9C:
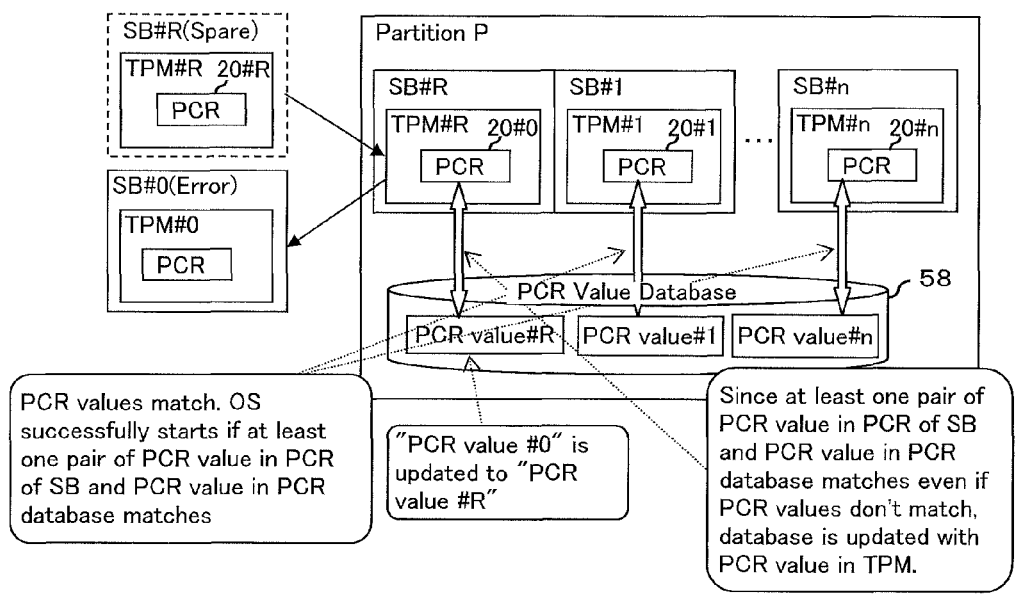
Figure 10:
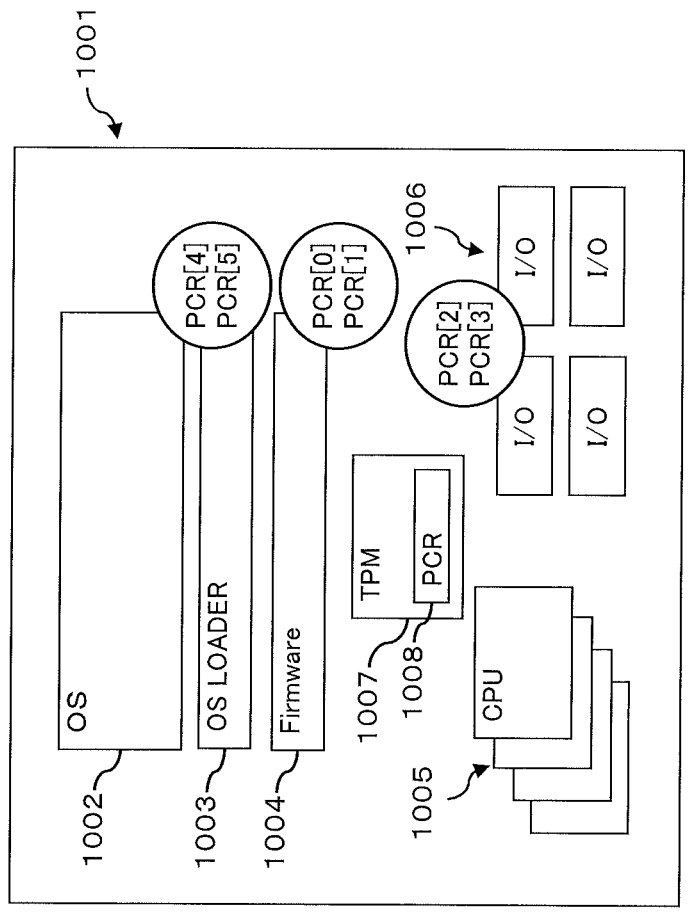
FIG. 10 is a diagram schematically illustrating the configuration of a conventional PC.

FIGS. 9A-9C are a diagram illustrating processing when system boards SB are swapped in a partition P in the server 100 as one example of an embodiment.

Upon startup of the partition P in the locked state, if there is at least one matched pair of a PCR value in a PCR 20 in a TPM of a system board SB and a PCR value for the corresponding TPM stored in the HDD 60 (the PCR value database 58), the OS 30 (the continuing operation control unit 59) completes the startup processing normally, as depicted in FIG. 9A.

Here, as depicted in FIG. 9B, let's assume that an error occurs in one of the system boards SB (system board SB #0 in the example depicted in FIG. 9B) within the partition P.

In such a case, as depicted in FIG. 9C, the swap function isolates the failed system board SB #0, and the spare system board SB #R is included to the partition P, after the reboot of the partition P.

For the spare system board SB #R swapped by the swap function, the PCR value stored in the PCR 20#R does not match the PCR value corresponding to the TPM #0 maintained in the PCR value database 58.

However, in this server 100, even when the system board SB #0 and the spare system board SB #R are swapped during the reboot, the PCR values match for the other system boards SB #1-#n. More specifically, values stored in the PCRs of the TPMs #1-#n in other system boards SB #1-#n match the PCR values corresponding to the TPMs #1-#n maintained in the PCR value database 58. Consequently, the OS 30 (the continuing operation control unit 59) completes the startup process normally.

In addition, values stored in the PCRs of the TPMs #1-#n in the spare system board SB #R match the PCR values corresponding to the TPMs #1-#n maintained in the PCR value database 58. Consequently, the PCR value updating unit 56 updates the PCR value corresponding to the TPM #0 maintained in the PCR value database 58 with the PCR values stored in the PCR 20#R of the TPM #R.

Here, let's consider the case wherein a platform, such as firmware 10 or an I/O unit 42, has been tampered in one of system boards SB in the partition P. As a result of the tampering of the platform, configuration information collected, upon startup of the partition P, by the configuration information collection unit 52 from the platform is modified.

The modified configuration information is sent to respective TPMs by the PCR storage control unit 53, which is hashed by hash engines 22 in the respective TPMs. Accordingly, resultant PCR values stored in the PCRs 20 of the respective TPMs are also modified.

The PCR values stored in these PCRs 20 are obtained by the PCR value obtainment unit 54, and compared against the corresponding PCR values stored in the HDD 60 by the PCR value comparison unit 55, and mismatch of the PCR values is detected for all TPMs.

Since no PCR values match for all TPMs, an error process is executed without being prevented by the continuing operation control unit 59, resulting in aborting of the startup processing, issuing a warning, or the like. More specifically, the tampering of the partition P is detected, and it is ensured that processing to be performed in response to the detection of the tampering is executed, realizing a secure boot, exploiting the TPM functions. This enables highly reliable system operations.

In such a case, the PCR value updating unit 56 does not update the PCR values in the HDD 60 since no PCR value obtained by the PCR value obtainment unit 54 matches the corresponding PCR value stored in the HDD 60 for any of the multiple TPMs, during comparison of the PCR values by the PCR value comparison unit 55. This prevents PCR values based on the configuration information of the tampered platform from being stored in the HDD 60, and the reliability of the system is maintained.

As described above, according to the server 100, once the failed system board SB is swapped with a spare system board SB #R of a similar configuration, it is determined that the platform is not tampered if there is at least one matched pair of PCR values.

More specifically, if there is at least one matched pair of a PCR value related to a TPM in other unchanged system boards SB and a corresponding PCR value maintained in the PCR value database 58, corresponding to these system boards SB, startup process of the OS 30 is completed.

This can minimize downtime of operation on the partition P when the failed system board SB is swapped with a spare system board SB #R. This can minimize impacts on mission critical operations. This also enables exploitation of the TPM functions and improves the reliability.

For the swapped spare system board SB #R, only when it is confirmed that configuration of the partition P has not been modified, the PCR value updating unit 56 updates the PCR value maintained in the PCR value database 58, corresponding to the TPM #0. In other words, the PCR value updating unit 56 updates the PCR value corresponding to the TPM #0 Maintained in the PCR value database 58 with the PCR values stored in the PCR 20#R of the TPM #R.

Thereby, the partition P is not prevented from being aborted in a subsequent startup of the partition P, only for the reason in that the swap function has swapped the system board SB #0 with the system board SB #R. In addition, a secure boot using the TPMs can be realized.

Furthermore, if a platform, such as firmware 10 or an I/O unit 42, has been tampered in one of the system boards SB in the partition P, it is ensured that the tampering is detected to execute an error process, thereby enabling reliable system operations exploiting the TPM functions.

In addition, PCR values based on configuration information on the tampered platform are prevented from being stored into the HDD 60, and thus the reliability of the system is maintained.

Note that the present disclosure is not restricted to the embodiment described above, and various modifications may be made without departing from the spirit of the present disclosure.

For example, while one spare system board SB #R is provided and any failed system board SB #0 is swapped with the system board SB #R in the above-described embodiment, this is not limiting. For example, two or more spare system boards SB may be provided and two or more failed system boards SB may be swapped with the two or more spare system boards SB.

The embodiments may be practiced or manufactured by those ordinally skilled in the art with reference to the above disclosure.

In the information processing apparatus, the startup control method of an information processing apparatus, and the startup program disclosed, even if a processing unit is swapped with another processing unit with a similar configuration, the startup processing of the information processing apparatus can be completed and a secure boot using the startup control unit is realized.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing apparatus including a plurality of processing units each having a hashing unit that performs a hash operation, a startup control unit that controls startup of the information processing apparatus, and a hardware resource, the information processing apparatus comprising:
   a configuration information collection unit that collects, in an unlocked state and a locked state, configuration information for respective hardware resources provided in the plurality of processing units, the unlocked state being a state in which whether the configuration information is modified is not detected upon startup of the information processing apparatus, and the locked state being a state in which whether the configuration information is modified is detected upon startup of the information processing apparatus;
   a configuration register control unit that stores, in the unlocked state and the locked state, a configuration register value generated by performing the hash operation, by a hashing unit in the corresponding processing unit, for the collected configuration information of the hardware resource for each processing unit, to a configuration register provided in a startup control unit of the corresponding processing unit;
   a storage unit that stores, in the unlocked state, the configuration register values read from the respective configuration registers by the configuration register control unit, by relating the configuration register values to the startup control unit in the corresponding processing unit, when the information processing apparatus is started without any configuration modification being detected;

a configuration register value obtaining unit that obtains, in the locked state after a reboot process, configuration register values stored in the respective configuration register;

a comparison unit that compares, in the locked state after the reboot process, the obtained configuration register value and the stored configuration register value which are set for each of the plurality of processing units; and an operation control unit that continues, in the locked state after the reboot process, startup processing of the information processing apparatus when the comparison unit detects any matched pair of an obtained configuration register value and stored configuration register value.

2. The information processing apparatus according to claim 1, further comprising:

an updating unit that updates a configuration register value stored in the storage unit corresponding to a detected unmatched pair of obtained configuration register value and stored configuration register value to the obtained corresponding configuration register value when the comparison unit detects an unmatched pair of obtained configuration register value and stored configuration register value.

3. A method of starting an information processing apparatus including a plurality of processing units each having a hashing unit that performs a hash operation, a startup control unit that controls startup of the information processing apparatus, and a hardware resource, the method comprising:

determining whether to detect configuration modification of the information processing apparatus upon startup of the information processing apparatus;

collecting, in an unlocked state and a locked state, configuration information of hardware resources in the respective processing units, the unlocked state being a state in which whether the configuration information is modified is not detected upon startup of the information processing apparatus, and the locked state being a state in which whether the configuration information is modified is detected upon startup of the information processing apparatus;

performing, in the unlocked state and the locked state, a hash operation on the collected configuration information of a hardware resource;

storing, in the unlocked state, a configuration register value generated by the hash operation in a configuration register provided in the startup control unit in the corresponding processing unit;

obtaining, in the locked state after a reboot process, configuration register values stored in the respective configuration registers;

comparing, in the locked state after the reboot process, the obtained configuration register value and the stored configuration register value which are set for each of the plurality of processing units; and continuing, in the locked state after the reboot process, startup processing of the information processing apparatus when any matched pair of an obtained configuration register value and a stored configuration register value is detected at the comparing.

4. The method of starting an information processing apparatus according to claim 3, further comprising: updating the stored configuration register value to the obtained corresponding configuration register value when an unmatched pair of obtained configuration register value and stored configuration register value id detected at the comparing.

5. The method of starting an information processing apparatus according to claim 3, further comprising: storing the configuration register values read from the respective configuration registers, by relating the configuration register values to the startup control unit in the corresponding processing unit, when the information processing apparatus is started without any configuration modification being detected.

6. A non-transitory computer-readable medium storing a startup program for directing an information processing apparatus comprising a computing unit that performs computing and a plurality of processing units each comprising a hashing unit that performs a hash operation, a startup control unit that controls startup, and a hardware resource to perform a process, the process comprising:

determining whether to detect configuration modification of the information processing apparatus upon startup of the information processing apparatus;

collecting, in an unlocked state and a locked state configuration information of hardware resources in the respective processing units, the unlocked state being a state in which whether the configuration information is modified is not detected upon startup of the information processing apparatus, and the locked state being a state in which whether the configuration information is modified is detected upon startup of the information processing apparatus;

performing, in the unlocked state and the locked state, a hash operation on the collected configuration information of a hardware resource;

storing, in the unlocked state, a configuration register value generated by the hash operation in a configuration register provided in the startup control unit in the corresponding processing unit;

obtaining, in the locked state after a reboot process, configuration register values stored in the respective configuration registers;

comparing, in the locked state after the reboot process, the obtained respective configuration register value and the stored configuration register value which are set for each of the plurality of processing units; and continuing, in the locked state after the reboot process, startup processing of the information processing apparatus when any matched pair of an obtained configuration register value and a stored configuration register value is detected at the detecting.

7. The non-transitory computer-readable medium storing the startup program according to claim 6, further comprising updating the stored configuration register value to the obtained corresponding configuration register value when an unmatched pair of obtained configuration register value and stored configuration register value id detected at the comparing.

8. The non-transitory computer-readable medium storing the startup program according to claim 6, further comprising storing the configuration register values read from the respective configuration registers, by relating the configuration register values to the startup control unit in the corresponding processing unit, when the information processing apparatus is started without any configuration modification being detected.

* * * * *